United States Patent [19]

Howard et al.

[11] 4,156,807
[45] May 29, 1979

[54] METHOD FOR PREVENTING BURR FORMATION DURING ELECTRON BEAM DRILLING

[75] Inventors: Curtiss G. Howard, Manchester, Conn.; Lester W. Jordan, Cranston, R.I.; Chester E. Yaworsky, Glastonbury, Conn.

[73] Assignee: United Technologies Corporation, Hartford, Conn.

[21] Appl. No.: 889,765

[22] Filed: Mar. 24, 1978

[51] Int. Cl.$^2$ ............................................. B23K 9/00
[52] U.S. Cl. ..................... 219/121 EM; 219/121 LM
[58] Field of Search .... 219/121 L, 121 LM, 121 EM, 219/121 EB

[56] References Cited
U.S. PATENT DOCUMENTS 3,832,948  9/1974  Barker .......................... 219/121 LM

*Primary Examiner*—J. V. Truhe
*Assistant Examiner*—Fred E. Bell
*Attorney, Agent, or Firm*—Edward J. Timmer; Charles G. Nessler

[57] ABSTRACT

Disclosed is an electron beam drilling process in which the workpiece surface first penetrated by the beam is coated with a stop-off material having the required high temperature resistance for preventing formation of burrs around the perimeter of the hole from hot molten spatter which is ejected from the entrance to the hole during the drilling operation. A preferred stop-off material is a substantially continuous layer of boron nitride on the first penetrated surface of the workpiece.

7 Claims, 1 Drawing Figure

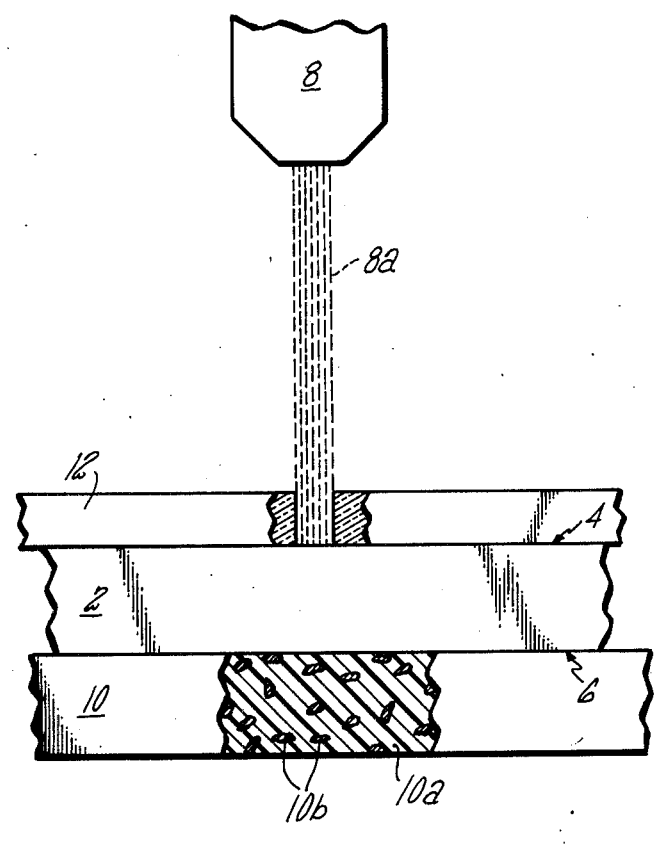

METHOD FOR PREVENTING BURR FORMATION DURING ELECTRON BEAM DRILLING

BACKGROUND OF THE INVENTION

1. Field of the Invention

The present invention relates to machining and, more particularly, to drilling holes, slots and other passageways through a workpiece by electron beam and other beam energy techniques.

2. Description of the Prior Art

The use of electron beam energy to drill one or more holes in a metallic or nonmetallic workpiece has only recently been investigated. As described in copending patent application Ser. No. 861,776, filed Dec. 19, 1977, entitled "Backer Layer For Electron Beam Drilling" of inventors Lester W. Jordan, Curtiss G. Howard and Chester E. Yaworsky and of common assignee herewith, a so-called backer layer generally in the form of a coating is required on the last penetrated surface of the workpiece during the drilling process. The purpose of the backer layer is to absorb excess electron beam energy as the beam penetrates the last penetrated workpiece surface and to generate sufficient vapor pressure by action of the beam locally thereon to expel the molten workpiece material from the hole being drilled in a direction opposite to the propagation of the electron beam, that is, from the entrance to hole in the first penetrated surface of the workpiece. However, as a result of this expulsion of molten material from the hole, there has been experienced a problem of burr formation around the perimeter of the hole in the first penetrated surface. Burrs appear to form from the molten spatter that is expelled from the hole and subsequently welds to the first penetrated surface in the vicinity of the hole perimeter. An expensive metal finishing operation is required to remove the burrs from the hole perimeter.

In the development of electron beam drilling, the parameters of drilling, such as beam energy, pulse duration and focus level, have been adjusted in attempts to minimize formation of burrs around the hole perimeter. However, to date, such attempts have not proved effective, especially from a commercial production standpoint.

SUMMARY OF THE INVENTION

In accordance with the present invention, the formation of burrs around the perimeter of the hole, slot or other passageway is substantially prevented by coating the first penetrated surface of the workpiece with an expendable layer of the stop-off material so that the hot molten spatter expelled from the hole during drilling of the workpiece wall is deposited on the layer rather than on the workpiece surface. The stop-off material is characterized by high temperature resistance such that, although the energy beam readily penetrates through the layer, the hot molten spatter deposited on the layer does not penetrate therethrough to weld to the workpiece surface and further that the heat generated in the workpiece wall during drilling does not seriously degrade the layer so as to cause loss of adhesion or delamination from the workpiece surface. The stop-off material is further characterized as being innocuous to the workpiece in that it must not adversely affect the properties or structure of the workpiece by introducing contaminants therein during drilling.

Although various ceramic materials are useful in the invention for stop-off purposes, a preferred stop-off material is boron nitride, for example, in the form of a substantially continuous layer on the first penetrated surface. Typically, the boron nitride layer is formed by mixing boron nitride particulate with a liquid diluent, such as water, and a binding agent and brushing or spraying the slurry mixture uniformly on the first penetrated surface. An adherent boron nitride stop-off layer is produced by drying the slurry coating on the workpiece surface.

These and other objects and advantages of the invention will become more fully apparent from the following drawing and detailed description of preferred embodiments.

BRIEF DESCRIPTION OF THE DRAWING

The FIGURE shows schematically an arrangement for carrying out the process of the invention on a workpiece wall having a backer layer and stop-off layer applied thereto.

DESCRIPTION OF PREFERRED EMBODIMENTS

The FIGURE illustrates schematically a typical arrangement for carrying out the drilling process of the present invention. Shown is a workpiece wall 2 to be drilled, the wall having a first penetrated surface 4 and a last penetrated surface 6, the first surface facing toward electron gun 8 which generates a beam 8a of electrons and directs the beam onto the first surface for drilling. Shown as a layer 10 on the last penetrated surface is a backer material for absorbing the excess energy from the beam as it penetrates the surface and for generating sufficient vapor pressure to cause expulsion of the molten workpiece material from the entrance to the hole in the first penetrated surface. Generally, the backer layer comprises a removable matrix 10a and energy absorbing filler particles 10b uniformly dispersed therein. Exemplary backer materails are discussed in the earlier cited copending application entitled "Backer Layer For Electron Beam Drilling."

According to the method of the invention, the formation of burrs around the perimeter of the entrance to the hole being drilled is prevented by applying to the first penetrated surface prior to drilling a stop-off material, preferably in the form of a substantially continuous layer 12 thereon, the stop-off material having high temperature resistance such that hot molten spatter ejected from the hole and deposited on the layer during drilling does not melt and/or vaporize through the layer to contact surface 4 and weld thereto and further that the heat generated in the workpiece wall 2 from drilling does not cause a loss of adhesion, delamination or severe distortion of the layer. So long as the stop-off layer remains adherent to the first penetrated surface throughout drilling, the formation of burrs around the hole perimeter will be minimized or prevented. Of course, that portion of the stop-off layer locally impinged by the electron beam will be melted and/or vaporized to allow the beam to strike the surface 4 for drilling. In general, most electron beam power levels required for drilling workpieces, for example, metals and alloys, are more than adequate to rapidly penetrate through the stop-off layers utilized in the invention.

Another requirement of the stop-off layer is that during drilling it must not contaminate or cause harmful changes in the structure or properties of the workpiece being drilled. For example, in drilling a metallic workpiece, the stop-off layer must not contain contaminating elements which might embrittle or otherwise adversely affect the mechanical properties of the workpiece in the vicinity of the hole. Those skilled in the art will readily recognize that the type of deleterious element to be excluded from the stop-off layer will depend upon the type of workpiece being drilled. In addition, it is also highly desirable that the stop-off material have no adverse or injurious effect on the electron beam gun when the layer is locally melted and/or vaporized at the commencement of drilling.

Various ceramic materials have been found suitable and are preferred for use as a stop-off layer in drilling metallic workpieces such as nickel alloys. Most of the materials are preferably applied to the first penetrated surface in liquid or slurry form. For example, sodium silicate in liquid form is coated onto the surface and then dried to produce the desired stop-off layer. The slurry form usually includes ceramic particles dispersed in a vaporizable liquid diluent, such as water or organic liquid or a mixture thereof, and preferably a binding agent of well known type. A wetting agent may also be included in the slurry to ensure uniform and continuous coverage of the first penetrated surface. Exemplary of stop-off layers applied in slurry form are milk of magnesia, levigated alumina in a polystyrene binder, boron nitride in an aqueous solution with an aluminate or other binder, glass frit dispersed in an organic binder known as Delta Glaze 17 manufactured by Acheson Colloids Co., Nicrobraze green stop-off manufactured by Colmonoy Corp., and a weld spatter preventive coating known as Protect-O-Metal manufactured by G. W. Smith and Sons, Inc. The stop-off layers in slurry form can be applied to the first penetrated surface by brushing, spraying and other conventional techniques. Of course, the amount of liquid diluent and/or wetting agent in the slurry mixture can be varied as desired to achieve proper spreadability or fluidity for the particular application technique selected. After the slurry mixture is applied to the first penetrated surface of the workpiece, it is air or oven dried to produce the desired continuous, adherent stop-off layer. A preferred stop-off material is boron nitride which has been applied in slurry form (for example, an aqueous solution containing about 50 weight percent boron nitride particulate and a binding agent such as sodium aluminate) and then air or oven dried to produce a substantially continuous and adherent boron nitride stop-off layer on the first penetrated surface. However, a stop-off layer which can be applied to the workpiece surface in solid form is represented by a high temperature glass cloth known as Mystik Tape #2001 manufactured by Borden Inc.

Of course, the type as well as thickness of stop-off layer employed will depend upon the particular workpiece to be drilled, the depth of hole to be produced and other factors. Those skilled in the art will readily discern suitable combinations of stop-off materials, workpiece materials and layer thicknesses. For a boron nitride layer applied to a nickel or cobalt base alloy workpiece, a layer of a thickness on the order of 1 to 5 mils has been found satisfactory in preventing burr formation for hole depths up to 0.8 inch.

Although it is both preferred and expedient to provide the stop-off material on the first penetrated surface as a substantially continuous layer, it will be apparent that the actual surface coverage required is only that necessary to prevent burr formation in the vicinity of the hole perimeter. Thus, in certain situations, less than total surface coverage by the stop-off layer may be provided. Of course, the extent to which the stop-off layer is required to cover the first penetrated surface will depend upon the number of holes to be drilled and their size.

Since the stop-off layer is usually removed from the workpiece surface after drilling is completed, it is important that the layer be expendable and easily removable by conventional means. The ceramic stop-off layers of the invention can be readily removed by such conventional techniques as dissolution (in hot water, strong acids or alkalies), heating, peeling and the like.

Although the invention has been illustrated in the FIGURE as useful for drilling a hole whose longitudinal axis is normal to the workpiece surface, it will be appreciated that one or more holes whose longitudinal axes are inclined relative to the surface can also be produced. Those skilled in the art will also recognize that the stop-off layers of the invention may be used in other machining processes which utilize a beam of energy to effect removal of material through the workpiece, for example, laser or ion drilling. Of course, other changes, additions and omissions may be made to the preferred embodiments without departing from the spirit and scope of the invention.

Having thus described typical embodiments of our invention, that which we claim as new and desire to secure by Letters Patent of the United States is:

1. In drilling a hole, slot or other passageway through a workpiece wall having a first penetrated and last penetrated surface by localized impingement of an energy beam on said first surface, wherein molten workpiece spatter is expelled from the hole during drilling and deposits on and welds to said first surface around the hole perimeter in the form of one or more burrs, the step of substantially preventing burr formation by:

coating the first penetrated surface prior to drilling with an expandable layer of stop-off material so that hot molten spatter expelled from the hole during drilling of the workpiece wall is deposited on said layer, the stop-off material being characterized by high temperature resistance such that, although the energy beam readily penetrates through the layer to strike said first surface, the hot molten spatter deposited thereon does not penetrate through the layer to weld to said first surface and further that the heat generated in the workpiece wall during drilling does not significantly degrade the layer so as to cause loss of adhesion from said first surface, said stop-off material being further characterized as innocuous to the workpiece properties.

2. The method of claim 1 wherein the energy beam is an electron beam.

3. The method of claim 1 wherein the stop-off material is a ceramic material.

4. The method of claim 3 wherein the ceramic material is boron nitride.

5. The method of claim 1 wherein the stop-off material is applied to the first penetrated surface in liquid form and then dried to produce a substantially continuous stop-off layer on the surface.

6. The method of claim 1 wherein the stop-off material is in particulate form and is applied to the first surface by mixing a slurry of the particulate, a binding agent and a liquid diluent, spreading the slurry on the first surface and then drying the slurry layer to produce a substantially continuous stop-off layer on the surface.

7. The method of claim 1 including the additional step of removing the stop-off material from the first surface after drilling is completed.

* * * * *